United States Patent [19]
Umeda et al.

[11] Patent Number: 6,022,603
[45] Date of Patent: Feb. 8, 2000

[54] ETHYLENE TEREPHTHALATE/ETHYLENE-2,6-NAPHTHALENE-DICARBOXYLATE COPOLYMERS FOR BOTTLES

[75] Inventors: Masami Umeda; Kimihiko Sato; Minoru Suzuki, all of Matsuyama, Japan

[73] Assignee: Teijin Limited, Osaka, Japan

[21] Appl. No.: 09/155,763

[22] PCT Filed: Apr. 1, 1997

[86] PCT No.: PCT/JP97/01127

§ 371 Date: Oct. 5, 1998

§ 102(e) Date: Oct. 5, 1998

[87] PCT Pub. No.: WO97/38038

PCT Pub. Date: Oct. 16, 1997

[30] Foreign Application Priority Data

Apr. 5, 1996 [JP] Japan ..................................... 8-083941

[51] Int. Cl.⁷ .............................. B29D 22/00; C08K 3/02; C08G 63/00
[52] U.S. Cl. ....................... 428/36.92; 528/275; 528/276; 528/280; 528/286; 528/298; 528/302; 528/308; 528/308.6; 524/706; 524/710; 524/777; 524/785; 428/35.7
[58] Field of Search ..................................... 528/275, 276, 528/280, 286, 298, 302, 308, 308.6; 524/706, 710, 785, 777; 428/35.7, 36.92

[56] References Cited

U.S. PATENT DOCUMENTS

| | | | |
|---|---|---|---|
| 4,501,878 | 2/1985 | Adams | 528/286 |
| 4,622,268 | 11/1986 | Yatsu et al. | 428/480 |
| 4,692,506 | 9/1987 | Yatsu et al. | 528/296 |
| 5,556,675 | 9/1996 | Yamamoto et al. | 428/36.92 |
| 5,851,612 | 12/1998 | Umeda et al. | 428/35.7 |
| 5,898,060 | 4/1999 | Suzuki et al. | 428/35.7 |

FOREIGN PATENT DOCUMENTS

| | | |
|---|---|---|
| 0 399 799 | 11/1990 | European Pat. Off. . |
| 61-78828 | 4/1986 | Japan . |
| 3-182523 | 8/1991 | Japan . |
| 4-500387 | 1/1992 | Japan . |
| 7-223623 | 8/1995 | Japan . |
| WO 96/19517 | 6/1996 | WIPO . |

OTHER PUBLICATIONS

Abstract, XP–002107926, Jan. 1978.

Abstract, XP–002107927, Jul. 1976.

Abstract, XP–002107928, Apr. 1994.

Abstract, XP–002107929, Oct. 1989.

*Primary Examiner*—Samuel A. Acquah
*Attorney, Agent, or Firm*—Foley & Lardner

[57] ABSTRACT

An ethylene terephthalate/ethylene-2,6-naphthalene dicarboxylate copolymer comprising 2,6-naphthalenedicarboxylic acid in an amount of 5 to 20 mol % of the total of all dicarboxylic acid components. This copolymer contains Mn, Mg and Co derived from catalysts and P derived from a phosphorus compound as a stabilizer whose amount is controlled to a specific value and is suitable for use as a raw material for molding a bottle having good color (achromatic) and transparency.

10 Claims, No Drawings

ETHYLENE TEREPHTHALATE/ETHYLENE-2,6-NAPHTHALENE-DICARBOXYLATE COPOLYMERS FOR BOTTLES

TECHNICAL FIELD

The present invention relates to an ethylene terephthalate/ethylene-2,6-naphthalene dicarboxylate copolymer to be used as a raw material for molding a bottle. More specifically, it relates to an ethylene terephthalate/ethylene-2,6-naphthalene dicarboxylate copolymer useful as an achromatic polymer that has excellent gas barrier properties and transparency as well as ultraviolet-shielding properties and is used as a raw material for molding a bottle.

BACKGROUND ART

Since polyethylene-2,6-naphthalene dicarboxylate (simply abbreviated as PEN hereinafter) is superior to polyethylene terephthalate (simply abbreviated as PET hereinafter) in basic physical properties such as heat resistance, gas barrier properties and chemical resistance, it is expected to be useful as packaging materials for bottles (containers), sheet materials or the like. Therefore, there have been made a large number of proposals for the use of a blend of PEN and PET, a copolymer comprising recurring units of PEN and recurring units of PET, and PEN alone. Of the packaging materials, a material for use in drinking bottles for juice and the like is strongly desired to have excellent color and transparency, from the viewpoint of product value. Basically, PEN can be caused to react in the presence of the same catalyst system as that of PET, and the use of germanium dioxide as a polymerization catalyst is expected to be effective from the viewpoint of color.

JP-A 61-78828 discloses a process for producing a polyester through an ester interchange reaction and a subsequent polycondensation reaction, wherein the process is carried out in the presence of (a) a catalytic amount of an antimony compound, (b) a glycol-soluble manganese compound and/or magnesium compound, (c) an alkali metal compound and (d) at least one phosphorus compound selected from the group consisting of phosphorous acid, phosphoric acid and esters thereof, the amounts of the components (b) and (c) satisfying the following expressions (1) to (3):

$$M \leq 50 \quad (1)$$

$$A \leq 60 \quad (2)$$

$$A/M \geq 0.73 \quad (3)$$

wherein M is an amount of the component (b) used (mmol % based on the total amount of all acid components), and A is an amount of the component (c) used (mmol % based on the total amount of all acid components). However, this publication is silent about the use of a cobalt catalyst and has no disclosure of an ethylene naphthalate/ethylene-2,6-naphthalene dicarboxylate copolymer.

JP-A 7-223623 discloses a heat-resistant bottle that is made from a copolyester comprising 85 to 95 mol % of terephthalic acid and 5 to 15 mol % of 2,6-naphthalenedicarboxylic acid as acid components and ethylene glycol as an alcohol component, the copolyester having a glass transition temperature of 75° C. or higher when it has a moisture content in an amount of 3,000 ppm or more. This publication, however, discloses only the use of calcium acetate as an ester-interchange catalyst. A polyester produced using an organic acid calcium such as calcium acetate as an ester-interchange catalyst is satisfactory from the viewpoint of the color of the polymer, but it has a tendency to produce large deposited particles in large quantities, thereby making it difficult to suppress whitening at the time of blow-molding a bottle. Since a copolyester having a large content of ethylene terephthalate has a higher crystallization speed than that of PEN on the whole, a catalyst system which can be generally used for the production of PEN for bottles cannot be used.

Furthermore, a polymer produced using a Ti-based catalyst as the catalyst system for suppressing deposited particles is deeply tinted with yellow and is therefore not suitable for use as a polymer for bottles. Although there is known a method for controlling this yellow tint by the addition of a cobalt-based catalyst, the polymer becomes blackish if the yellow tint is suppressed and hence, a co-PET having excellent performance cannot be obtained.

DISCLOSURE OF THE INVENTION

It is an object of the present invention to provide an ethylene terephthalate/ethylene-2,6-naphthalene dicarboxylate copolymer for molding a bottle.

It is another object of the present invention to provide an achromatic ethylene terephthalate/ethylene-2,6-naphthalene dicarboxylate copolymer that has excellent gas barrier properties and transparency as well as ultraviolet-shielding properties and is used for molding a bottle.

It is still another object of the present invention to provide a bottle made from the above copolymer of the present invention.

Other objects and advantages of the present invention will become apparent from the following description.

According to the present invention, the above objects and advantages of the present invention can be attained by an ethylene terephthalate/ethylene-2,6-naphthalene dicarboxylate copolymer for bottle, which comprises terephthalic acid and 2,6-naphthalenedicarboxylic acid as main dicarboxylic acid components and ethylene glycol as a main glycol component, wherein the molar ratio of the terephthalic acid component to the 2,6-naphthalenedicarboxylic acid component is 80/20 to 95/5, and manganese, magnesium, phosphorus and optionally cobalt, are contained in such amounts that satisfy the following expressions (1) to (5):

$$0 \leq Mn \leq 40 \quad (1)$$

$$0 \leq Mg \leq 80 \quad (2)$$

$$0 < Co \leq 5 \quad (3)$$

$$15 \leq Mn + 1/2\ Mg \leq 40 \quad (4)$$

$$0.8 \leq P/(Mn+Mg+Co) \leq 1.5 \quad (5)$$

wherein Mn is a proportion (mmol %) of manganese based on the total of all dicarboxylic acid components constituting the copolymer, Mg is a proportion (mmol %) of magnesium based on the total of all dicarboxylic acid components, Co is a proportion (mmol %) of cobalt based on the total of all dicarboxylic acid components, and P is a proportion (mmol %) of phosphorus based on the total of all dicarboxylic acid components.

The main dicarboxylic acid components of the ethylene terephthalate/ethylene-2,6-naphthalene dicarboxylate copolymer of the present invention (may be referred to as "ET/EN copolymer of the present invention" hereinafter) are terephthalic acid and 2,6-naphthalenedicarboxylic acid. These main dicarboxylic acid components are preferably contained in a total amount of at least 90 mol %, more preferably at least 95 mol %, particularly preferably at least 98 mol %, of the total of all dicarboxylic acid components.

The copolymerization proportion of terephthalic acid to 2,6-naphthalenedicarboxylic acid is 80/20 to 95/5 in terms of molar ratio. A bottle produced from an ET/EN copolymer comprising less than 5 mol % of 2,6-naphthalenedicarboxylic acid cannot have an advantage of heat resistance because the mouth portion of the bottle made from such a copolymer is easily deformed and loosened when it is contacted with hot water heated at 95° C. Moreover, the ET/EN copolymer has the same gas barrier and ultraviolet-shielding properties as those of PET. On the other hand, when an ET/EN copolymer comprising more than 20 mol % of 2,6-naphthalenedicarboxylic acid is solid-phase polymerized to increase the degree of polymerization, thermal fusion occurs vehemently, thereby making it impossible to carry out solid-phase polymerization stably. The molar ratio of terephthalic acid component to 2,6-naphthalenedicarboxylic acid component is preferably 85/15 to 95/5.

A dicarboxylic acid other than terephthalic acid and 2,6-naphthalenedicarboxylic acid may be an aliphatic dicarboxylic acid, alicyclic dicarboxylic acid or aromatic dicarboxylic acid.

Illustrative examples of the other dicarboxylic acid include aliphatic dicarboxylic acids such as oxalic acid, malonic acid, succinic acid, adipic acid, sebacic acid, dodecanedicarboxylic acid and the like; aromatic dicarboxylic acids such as terephthalic acid, isophthalic acid, 4,4'-diphenyldicarboxylic acid, diphenoxyethane-4,4'-dicarboxylic acid, diphenylsulfone-4,4'-dicarboxylic acid, diphenylether-4,4'-dicarboxylic acid and the like; and alicyclic dicarboxylic acids such as hexahydroterephthalic acid, decalindicarboxylic acid, tetralindicarboxylic acid and the like.

The other dicarboxylic acid component is preferably contained in an amount of 10 mol % or less of the total of all dicarboxylic acid components.

The ET/EN copolymer of the present invention comprises ethylene glycol as a main glycol component. Ethylene glycol is preferably contained in an amount of at least 90 mol %, more preferably at least 95 mol %, particularly preferably 98 mol % of the total of all glycol components.

A glycol other than ethylene glycol may be an aliphatic diol, aromatic diol or alicyclic diol. Illustrative examples of the glycol include aliphatic diols such as tetramethylene glycol, propylene glycol, 1,3-butanediol, neopentyl glycol and the like; alicyclic diols such as cylohexanedimethanol, tricyclodecanedimethylol and the like; and aromatic diols such as bisphenol A, bisphenol S, bishydroxyethoxy bisphenol A, tetrabromobisphenol A and the like. The glycol other than ethylene glycol is preferably contained in an amount of 10 mol % or less of the total of all glycol components.

The ET/EN copolymer of the present invention may further contain an oxyacid component such as p-oxybenzoic acid. This amount of the oxyacid component may be contained by substituting an amount of 10 mol % or less of the total of all dicarboxylic acid components.

The ET/EN copolymer of the present invention may comprise, as a copolymer component, a polycarboxylic acid or polyhydroxy compound having 3 or more functional groups, such as trimellitic acid or pentaerythritol, in an amount of 2 mol % or less of the total of all acid components.

The ET/EN copolymer of the present invention can be produced, for example, by subjecting a corresponding dicarboxylic acid diester and glycol to an ester-interchange reaction (may be referred to as "EI reaction" hereinafter) and then polycondensation.

The ET/EN copolymer of the present invention contains manganese (Mn), magnesium (Mg), phosphorus (P) and optionally, cobalt (Co) in such amounts that satisfy the above expressions (1) to (5). Of these, Mn, Mg and Co can be derived from ester-interchange reaction catalysts used in the ester-interchange reaction.

A manganese compound, magnesium compound and cobalt compound used as ester-interchange catalysts are oxides, chlorides, carbonates or carboxylates of manganese, magnesium and cobalt, respectively. Of these, manganese acetate, magnesium acetate and cobalt acetate are particularly preferred.

The ET/EN copolymer of the present invention contains Mn, Mg and Co in such amounts that satisfy the above expressions (1) to (4). As is apparent from the expressions (1), (2) and (4), Mn and Mg may be zero (i.e., not contained), but at least either one of Mn and Mg is contained.

As for the above expression (4), when the amount of Mn+1/2 Mg is smaller than 15 mmol % (millimol %) of the total of all acid components, the EI reactivity is low and the EI reaction time is extremely long, which is inconvenient for production. On the contrary, when the amount of Mn+1/2 Mg is larger than 40 mmol % of the total of all acid components, the amount of deposited particles becomes large and these deposits become crystal nuclei, thereby causing whitening at the time of blow-molding a bottle. The ET/EN copolymer of the present invention which is produced in the presence of an Mn- or Mg-based catalyst has such an advantage that the coloration of a polymer can be suppressed even when it is melt-polymerized up to such an extent that intrinsic viscosity is relatively high. By the way, a Ti-based catalyst is known as an EI catalyst which tends to produce a small amount of deposited particles. A polymer produced in the presence of a Ti-based catalyst, however, is deeply tinted with yellow and therefore not suitable for use as a raw material for molding a bottle. In this case, a means may be taken in which melt polymerization is carried out until a prepolymer having a low intrinsic viscosity at which a yellow is not so distinct is obtained, and then a polymer having a targeted intrinsic viscosity is produced from the prepolymer by solid-phase polymerization. However, as the ET/EN copolymer of the present invention has a relatively low melting point, solid-phase polymerization must be carried out at a relatively low temperature, with the consequence that solid-phase polymerization takes long and the resulting polymer is colored in the end. Therefore, it is not practical to produce the ET/EN copolymer of the present invention in the presence of a Ti-based catalyst.

Although a Co-based catalyst is known as an EI catalyst which suppresses coloration, it hardly dissolves sufficiently in a polymer and hence, deposited particles function as the crystal nuclei of the polymer with the result that a bottle is whitened by crystallization at the time of blow molding. Therefore, it is not desired to use a Co-based catalyst in large quantities as an EI catalyst. The ET/EN copolymer of the present invention contains Co in such a small amount that satisfies the above expression (3).

If the amount of a Co compound added is larger than 5 mmol % of the total of all acid components, the resulting polymer is colored gray. Thus, the color of the polymer is deteriorated.

The ET/EN copolymer of the present invention further contains phosphorus derived from a phosphorus compound to deactivate the EI catalyst. The phosphorus is contained in such an amount that satisfies the above expression (5). When the molar ratio of P/(Mn+Mg+Co) is smaller than 0.8, the deactivation of the EI catalyst is not perfect, the thermal stability of the obtained polymer is poor, and the polymer may be colored or deterioration in the physical properties of the polymer may be brought about at the time of molding. When the molar ratio is larger than 1.5, the thermal stability of the obtained polymer is also poor disadvantageously. The molar ratio is preferably 1.1 to 1.3.

The phosphorus compound used to stabilize the EI catalyst is preferably a compound represented by the following formula (6):

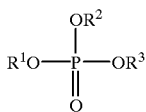

wherein $R^1$, $R^2$ and $R^3$ may be the same or different and each a hydrogen atom, a methyl group, an ethyl group and a hydroxyethyl group.

In a compound represented by the above formula (6) in which $R^1$, $R^2$ and $R^3$ are bulky groups, particles produced by stabilization are apt to be large in size disadvantageously. The phosphorus compound of the above formula (6) is, for example, orthophosphoric acid, trimethyl phosphate, monomethyl phosphate or dimethyl phosphate. Orthophosphoric acid and trimethyl phosphate are preferred particularly because they are easily available and inexpensive.

A polycondensation catalyst which is known as a catalyst that can be used jointly in the melt polycondensation reaction of a polyester can be used in a polycondensation reaction for forming the ET/EN copolymer of the present invention, and an antimony compound such as antimony trioxide or antimony acetate or a germanium compound such as germanium dioxide is preferably used as the polycondensation catalyst.

Germanium dioxide is preferably used from the viewpoint of the color of the polymer. Particularly, when so-called amorphous germanium dioxide having no crystal form is used, a polymer having a smaller amount of deposited particles and more transparent can be obtained than when normal crystalline germanium dioxide is used. The term "amorphous" used herein means a form having substantially no peak in the Raman spectrum. When the amount of the amorphous germanium dioxide added is too small, the polymerization reactivity is low with the result of low productivity. On the other hand, when the amount is too large, the thermal stability of the polymer lowers with the result of deterioration in physical properties and color at the time of molding. Therefore, the amount of the amorphous germanium dioxide added to the polymer is preferably around 20 to 50 mmol % of the total of all acid components.

Further, in the production of the ET/EN copolymer of he present invention, it is preferred to blend an ammonium compound represented by the following formula (7):

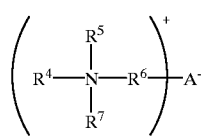

wherein $R^4$, $R^5$, $R^6$ and $R^7$ are independently a hydrogen atom, an alkyl group, a cycloalkyl group, an aryl group or a substituted derivative thereof, $R^4$ and $R^5$ may form a ring, and A is an residual anionic group, in order to enhance the suppression effect on deposition of deposited particles due to the ester interchange catalyst.

Illustrative examples of the ammonium compound include quaternary ammonium salts such as hydroxytetramethyl ammonium, hydroxytetraethyl ammonium, hydroxytetrabutyl ammonium, tetraethyl ammonium chloride and the like; tertiary ammonium salts such as hydroxytrimethyl ammonium and the like; secondary ammonium salts such as hydroxydimethyl ammonium and the like; primary ammonium salts such as hydroxymethyl ammonium and the like; and ammonium salts such as hydroxyammonium, ammonium chloride and the like. These ammonium compounds may be used alone or in combination of two or more.

The amount of the ammonium compound is preferably 0.04 to 0.4 mole, more preferably 0.07 to 0.2 mole, per $10^6$ g of the total of all dicarboxylic acid components constituting the polyester. When the amount is smaller than 0.04 mole, the effects of suppressing the deposition of catalyst particles and finely dispersing the catalyst particles are small and transparency is not so improved. On the other hand, when the amount is larger than 0.4 mole, these effects are not so improved, and what is worse, a tendency toward deterioration in polymerization reactivity is seen.

The ammonium compound can be added during the period after the ester interchange reaction substantially terminates and before the intrinsic viscosity reaches 0.2 dl/g. The order of addition of the ammonium compound and the above phosphorus compound is not particularly limited, but the ammonium compound is preferably added before the addition of the phosphorus compound.

The time of adding the germanium compound is also not particularly limited, but the germanium compound is particularly preferably added at the point when at least minutes pass after the addition of the phosphorus compound and before the intrinsic viscosity reaches 0.3. The atmosphere of a reaction system at the time of addition may be under atmospheric pressure before the start of the polycondensation reaction or under reduced pressure after the start of the polycondensation reaction.

It is preferred to subject the polymer (prepolymer) obtained by the above reaction to solid-phase polymerization to adjust its intrinsic viscosity to a range of 0.7 to 0.95 and then to use it.

The intrinsic viscosity of the prepolymer is not particularly limited, but it is preferably 0.50 to 0.67 (dl/g) from the viewpoint of production efficiency and quality.

When the intrinsic viscosity of the polymer obtained by the above reaction is increased only by melt polymerization to a practical level that allows it to be used as a raw material for molding a bottle, the coloration of the polymer becomes more distinct or the melting temperature becomes too high with the result that a load on an apparatus increases. Such a method of increasing the intrinsic viscosity only by conducting the melt polymerization, therefore, cannot be recommended. Furthermore, the resulting polymer is of extremely low quality as a polymer to be used as a raw material for molding a bottle because the content of aldehydes therein is large.

EXAMPLES

The following Examples are given to further illustrate the present invention. "Parts" in the following Examples means parts by weight. The values of characteristic properties in the following Examples are measured in accordance with the following methods.

(1) Intrinsic Viscosity [η]

This was calculated from the viscosity of a solution measured at 35° C. in a solvent of phenol/tetrachloroethane (weight ratio of 3/2).

(2) B-Value (Color)

The polymer was heated in a drier at 160° C. for 90 minutes to be crystallized, and the b-value of the polymer was measured by the model CM-7500 color machine of Color Machine Co., Ltd.

(3) Haze of Molded Product

The polymer was dried at 160° C. for 7 hours, and molded into 50 g of a preform at a cylinder temperature of 300° C. using the Dynamelter M-100DM injection molding machine of Meiki Co., Ltd. The preform was blow-molded into a bottle having an inner volume of 1.5 liters and a barrel thickness of 0.2 mm. A straight barrel portion was cut out from the bottle and the haze of the portion was measured using a haze meter (Model 1001DP of Nippon Denshoku Kogyo Co., Ltd.).

4) Looseness of Mouth Portion of Bottle When Filled With Hot Water

The bottle obtained in (3) was filled with water heated at 85° C. without crystallizing the mouth portion of the bottle, capped tightly, laid horizontally for 10 minutes and then, erected to check the looseness of the cap.

(5) Deposited Particles

The straight barrel portion of the bottle obtained in (3) was observed by an optical microscope at a magnification of 400X to observe the amount of deposited particles ascribed to the catalyst.

(6) Color (Visual Inspection)

The bottle produced in (3) was observed with the naked eye.

Example 1

10 Parts of dimethyl-2,6-naphthalene dicarboxylate, 90 parts of dimethyl terephthalate and 63 parts of ethylene glycol (EG) were subjected to an ester interchange reaction in accordance with a commonly used method using 0.0038 part (3 mmol % of the total of all acid components) of cobalt acetate tetrahydrate and 0.031 part (25 mmol % of the total of all acid components) of manganese acetate tetrahydrate as ester interchange catalysts, and 0.025 part (35 mmol % of the total of all acid components) of trimethyl phosphate was added when the amount of methanol distilled out reached 90% of its theoretical amount to substantially terminate the ester interchange reaction. The final reaction temperature at this point was 240° C. After 1.85 parts (35 mmol % of the total of all acid components) of a 1% amorphous germanium dioxide solution in EG was added, a polycondensation reaction was carried out at a high temperature and a high degree of vacuum in accordance with a commonly used method, and a reaction product was extracted into a large amount of running water in accordance with a commonly used method and formed into strand chips by a pelletizer. The intrinsic viscosity of the polymer obtained at this point was 0.62. This chip was solid-phase polymerized at 205° C. in an $N_2$ atmosphere of 0.5 mmHg to raise the intrinsic viscosity of the polymer to 0.82.

Examples 2 to 4 and Comparative Examples 1 to 10

Polymers were obtained in the same manner as in Example 1 except that the cobalt acetate tetrahydrate (Co (OAc)$_2$.4H$_2$O), manganese acetate tetrahydrate (Mn(OAc)$_2$.4H$_2$O), magnesium acetate tetrahydrate (Mg(OAc)$_2$.4H$_2$O), calcium acetate hydrate (Ca(OAc)$_2$.4H$_2$O) and a phosphoric acid compound were changed as shown in Table 1. The qualities and evaluation results of the obtained polymers are also shown in Table 1.

TABLE 1

| | Polymer composition | Catalyst, etc. (mmol %*1) | | | | | | | | Molar ratio |
|---|---|---|---|---|---|---|---|---|---|---|
| | QC/MDT Molar ratio | Co(OAc)$_2$.4H$_2$O | Mn(OAc)$_2$.4H$_2$O | Mg(OAc)$_2$.4H$_2$O | Ca(OAc)$_2$.H$_2$O | *2Phosphorus compound | | GeO$_2$ | Mn + ½Mg | $\frac{P}{(Mn + Mh + Co)}$ |
| Ex. 1 | 8/92 | 3 | 25 | — | — | A | 35 | 35 | 28 | 1.25 |
| Ex. 2 | " | 3 | 12 | 30 | — | A | 56 | " | 30 | 1.24 |
| Ex. 3 | " | 3 | — | 60 | — | A | 79 | " | 33 | 1.25 |
| Ex. 4 | " | 3 | 25 | — | — | A | 35 | " | 28 | 1.25 |
| C. Ex. 1 | 8/92 | — | — | — | 60 | A | 75 | 35 | 0 | P/Ca 1.25 |
| C. Ex. 2 | " | — | — | — | 60 | B | " | " | " | P/Ca 1.25 |
| C. Ex. 3 | " | — | — | — | 25 | A | 31 | " | " | P/Ca 1.24 |
| C. Ex. 4 | " | 3 | 50 | — | — | A | 66 | " | 53 | 1.25 |
| C. Ex. 5 | " | 3 | — | 90 | — | A | 116 | " | 48 | " |
| C. Ex. 6 | " | 13 | 25 | — | — | A | 48 | " | 38 | 1.26 |
| C. Ex. 7 | " | 3 | 25 | — | — | A | 20 | " | 28 | 0.71 |
| C. Ex. 8 | " | 3 | 25 | — | — | A | 45 | " | " | 1.61 |
| C. Ex. 9 | 0/100 | 3 | 25 | — | — | A | 35 | " | " | 1.25 |
| C.Ex. 10 | 25/75 | 3 | 25 | — | — | A | " | " | " | " |

| | Prepolymer | | Solid-phase polymerized polymer | | Qualities of bottle | | | |
|---|---|---|---|---|---|---|---|---|
| | Polymerization time (minute) | [η] (dl/g) | [η] (dl/g) | Color L/b | Looseness of mouth portion when filled with hot water | *3Amount of deposited particles | Haze of bottle | *4Color (visual inspection) |
| Ex. 1 | 153 | 0.62 | 0.82 | 80/2.2 | not loosened | ⊙ | 1.1 | ○ |
| Ex. 2 | 159 | " | " | 80/2.8 | " | ○ | 1.1 | ○ |
| Ex. 3 | 149 | " | " | 80/2.5 | " | ○ | 1.2 | ○ |
| Ex. 4 | 155 | " | " | 81/1.8 | " | ○ | 1.3 | ○ |
| C. Ex. 1 | 178 | 0.62 | 0.82 | 81/3.1 | not loosened | Δ~x | 2.5 | ○ |
| C. Ex. 2 | 190 | " | " | 81/2.9 | " | x | 3.8 | ○ |
| C. Ex. 3 | 235 | " | \multicolumn{5}{l}{The polymerization speed was low and there was no feasibility because the solid-phase polymerization time for achieving [η] = 0.82 was outside the predetermined range.} | | | — |
| C. Ex. 4 | 152 | " | 0.82 | 79/3.1 | not loosened | Δ | 1.6 | ○ ~Δ |
| C. Ex. 5 | 144 | " | " | 78/3.5 | " | Δ | 1.7 | Δ |
| C. Ex. 6 | 148 | " | " | 63/-8.5 | " | ○ ~Δ | 1.2 | x |

TABLE 1-continued

| | | | | | | | | |
|---|---|---|---|---|---|---|---|---|
| C. Ex. 7 | 127 | " | " | 72/4.6 | " | ○ | 1.4 | × |
| C. Ex. 8 | 185 | " | " | 75/4.3 | " | ○ | 1.5 | × |
| C. Ex. 9 | 128 | " | " | 83/–1.5 | loosened | ○ | 0.9 | ○ |
| C. Ex. 10 | 191 | " | " | | Solid-phase polymerization was impossible due to great fusion. | — | — | — |

*[1] proportion based on dibasic acid component constituting polyester
*[2] phosphorus compound A: trimethyl phosphate
B: mixture of compound represnted by the following formula:

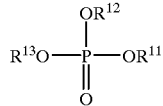

wherein $R^{11}$, $R^{12}$ and $R^{13}$ and independently H, $CH_3$ or $CH_2CH_2OH$.
*[3] Amount of deposited particles: ⊚ very little, ○: a little Δ: much, ×: very much
*[4] Overall evaluation of whitening, yellow and black tints by visual inspection: ○ good, Δ slightly bad, × bad As is understood from the above results, when calcium acetate hydrate is used as an EI catalyst, the amount of deposited particles is large and the haze of a bottle cannot be reduced (Comparative Examples 1 and 2). When the amount of calcium acetate hydrate is reduced in order to lower the haze of a bottle, reduction in the melt polymerization speed and reduction in the solid- phase polymerization speed are marked due to the incomplete termination of the EI reaction, thereby reducing production efficiency (Comparative Example 3).

When manganese acetate tetrahydrate and magnesium acetate tetrahydrate are added more than required, the amount of deposited particles increases, thereby deteriorating color (Comparative Examples 4 and 5).

Similarly, the addition of cobalt acetate tetrahydrate in an excessive amount makes the polymer black-and-blue (Comparative Example 6), and the addition of the phosphorus compound in an amount outside of the required range deteriorates heat resistance and makes the polymer yellow-tinted after solid-phase polymerization (Comparative Examples 7 and 8).

On the other hand, when the amount of 2,6-naphthalenedicarboxylic acid is reduced, not only does the hot water resistance of the mouth portion of the bottle deteriorate but the ultraviolet-shielding and gas barrier properties thereof are also not improved. When the amount of naphthalenedicarboxylic acid is small, the quality of the polymer becomes as low as PET (Comparative Example 9). When the amount of 2,6-naphthalenedicarboxylic acid component to be copolymerized is too large, it is difficult to handle the polymer at the time of solid-phase polymerization and stable production becomes impossible.

As is evident from the above, since the co-PET of the present invention comprises 2,6-naphthalenedicarboxylic acid component in a predetermined small amount, there can be obtained a bottle of high commodity value which has improved gas barrier and ultraviolet-shielding properties and hot water resistance provided to the mouth portion and which is excellent in color and transparency and rarely whitened at the time of molding.

We claim:

1. An ethylene terephthalate/ethylene-2,6-naphthalene dicarboxylate copolymer for bottle which comprises terephthalic acid and 2,6-naphthalenedicarboxylic acid as main dicarboxylic acid components and ethylene glycol as a main glycol component, wherein the molar ratio of the terephthalic acid component to the 2,6-naphthalenedicarboxylic acid component is 80/20 to 95/5, and manganese, magnesium, phosphorus, and optionally cobalt, are contained in such amounts that satisfy the following expressions (1) to (5):

$$0 \leq Mn \leq 40 \quad (1)$$

$$0 \leq Mg \leq 80 \quad (2)$$

$$0 < Co \leq 5 \quad (3)$$

$$15 \leq Mn + 1/2\, Mg \leq 40 \quad (4)$$

$$0.8 \leq P/(Mn+Mg+Co) \leq 1.5 \quad (5)$$

wherein Mn is a proportion (mmol %) of manganese based on the total of all dicarboxylic acid components constituting the copolymer, Mg is a proportion (mmol %) of magnesium based on the total of all dicarboxylic acid components, Co is a proportion (mmol %) of cobalt based on the total of all dicarboxylic acid components, and P is a proportion (mmol %) of phosphorus based on the total of all dicarboxylic acid components.

2. The copolymer of claim 1, wherein the total amount of terephthalic acid and 2,6-naphthalene dicarboxylic acid is at least 90 mol % of the total of all dicarboxylic acid components.

3. The copolymer of claim 2, wherein a dicarboxylic acid other than terephthalic acid and 2,6-naphthalenedicarboxylic acid is an aliphatic dicarboxylic acid, alicyclic dicarboxylic acid or aromatic dicarboxylic acid and contained in an amount of 10 mol % or less of the total of all dicarboxylic acid components.

4. The copolymer of claim 1, wherein ethylene glycol is contained in an amount of at least 90 mol % of the total of all glycol components.

5. The copolymer of claim 4, wherein a glycol other than ethylene glycol is an aliphatic diol, alicyclic diol or aromatic diol and contained in an amount of 10 mol % or less of the total of all glycol components.

6. The copolymer of claim 1, wherein the molar ratio of the terephthalic acid component to the 2,6-naphthalenedicarboxylic acid component is 85/15 to 95/5.

7. The copolymer of claim 1, wherein manganese, magnesium and cobalt are derived from manganese acetate, magnesium acetate and cobalt acetate used as ester interchange reaction catalysts, respectively.

8. The copolymer of claim 1, wherein phosphorus is derived from a compound represented by the following formula (6):

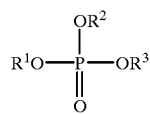

(6)

wherein $R^1$, $R^2$ and $R^3$ may be the same or different and each a hydrogen atom, methyl group, ethyl group or hydroxyethyl group.

9. The copolymer of claim 1, which has an intrinsic viscosity, measured at 35° C. in a mixed solvent of phenol and tetrachloroethane (volume ratio=3/2), of 0.7 to 0.95.

10. A bottle made from the ethylene terephthalate/ ethylene-2,6-naphthalene dicarboxylate copolymer of claim 1.

* * * * *